F. V. WEDLOCK.
SPONGE TRIMMING MACHINE.
APPLICATION FILED NOV. 29, 1916.
1,292,182.
Patented Jan. 21, 1919.
2 SHEETS—SHEET 1.
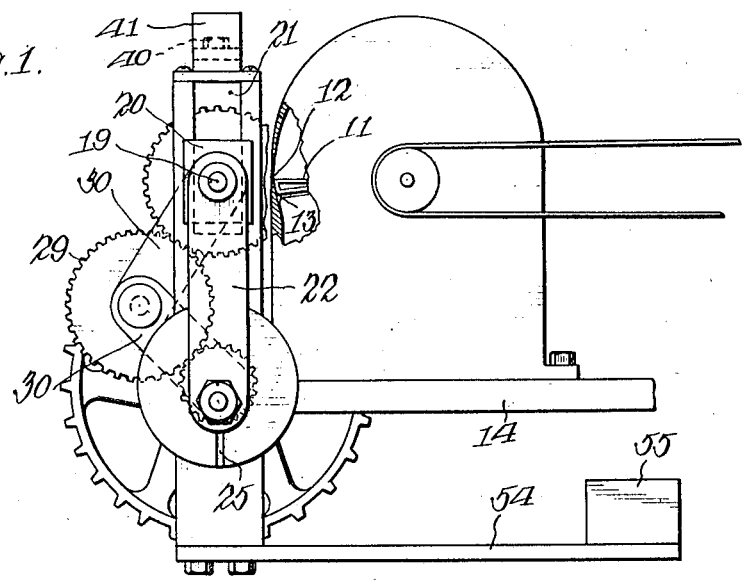
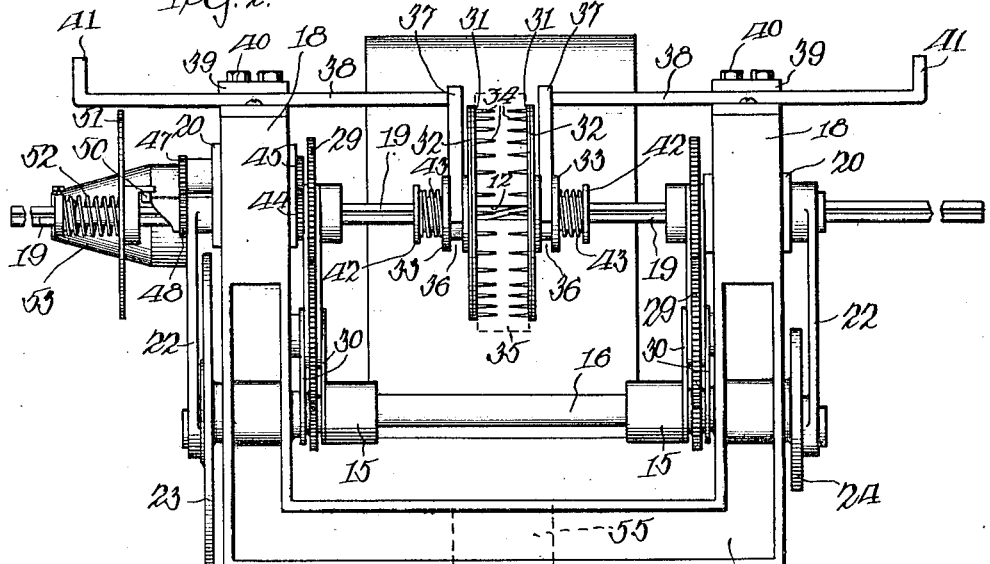
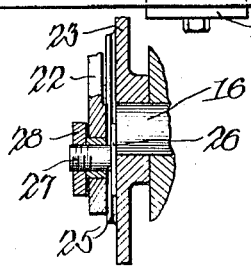
WITNESSES:
INVENTOR.
Frank V. Wedlock
BY Brown Nissen & Sprinkle
ATTORNEYS.

F. V. WEDLOCK.
SPONGE TRIMMING MACHINE.
APPLICATION FILED NOV. 29, 1916.
1,292,182.
Patented Jan. 21, 1919.
2 SHEETS—SHEET 2.
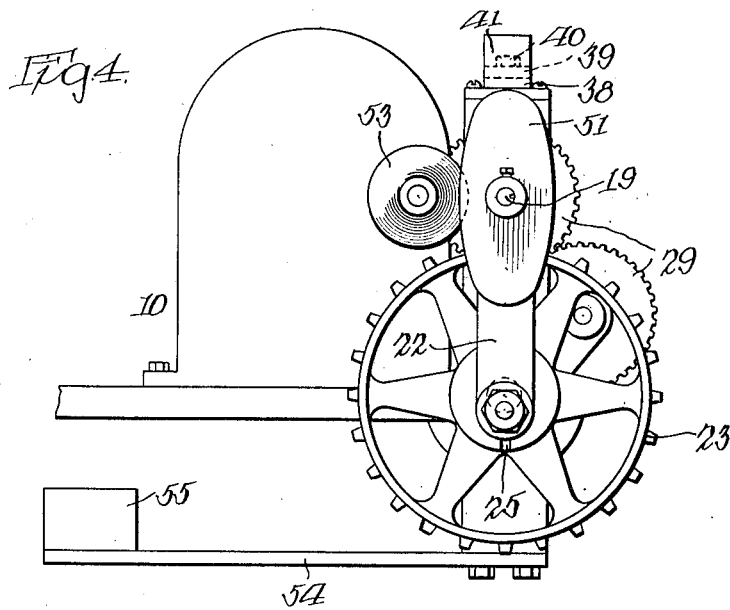
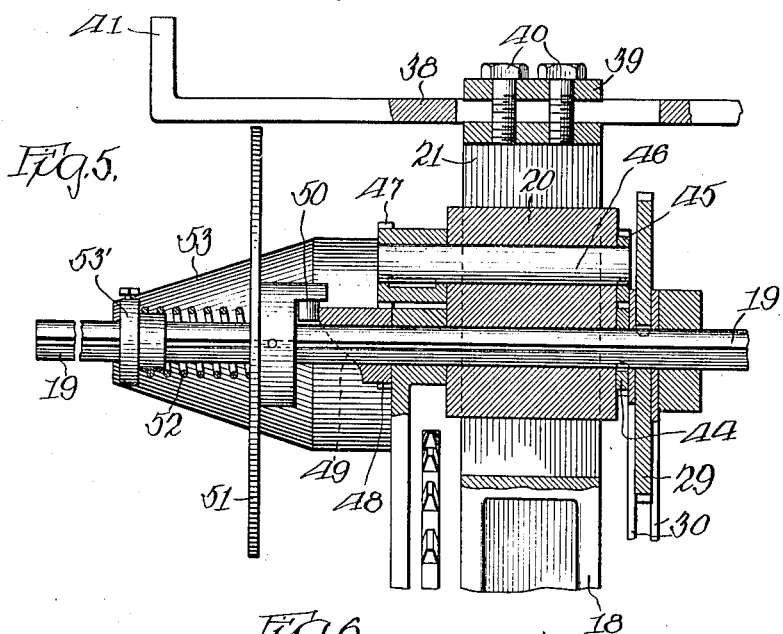
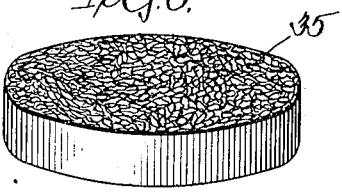
WITNESSES:
INVENTOR.
Frank V. Wedlock
BY
ATTORNEYS.

UNITED STATES PATENT OFFICE.

FRANK V. WEDLOCK, OF CHICAGO, ILLINOIS.

SPONGE-TRIMMING MACHINE.

1,292,182.   Specification of Letters Patent.   Patented Jan. 21, 1919.

Application filed November 29, 1916. Serial No. 134,170.

*To all whom it may concern:*

Be it known that I, FRANK V. WEDLOCK, a citizen of the United States, residing at Chicago, in the county of Cook and State of Illinois, have invented certain new and useful Improvements in Sponge-Trimming Machines, of which the following is a specification.

My invention relates to machines for trimming and shaping artificial sponges, and the like, and has for its object the provision of simple and efficient mechanism for automatically trimming off the periphery of artificial sponges, and the like, and also in giving desired shapes to such sponges, and the like. Other objects will appear hereinafter.

An embodiment of my invention is shown in the accompanying drawings forming a part of this specification, and in which—

Figure 1 is a side view of a device embodying my invention with portions broken away to show underlying parts.

Fig. 2 is a front view of the same.

Fig. 3 is an enlarged fragmental section showing an adjustable crank arm connection used in the construction.

Fig. 4 is a side elevation taken looking in the opposite direction from that indicated in Fig. 1 of a portion of the device.

Fig. 5 is an enlarged fragmental section taken on line 5—5 in Fig. 4; and

Fig. 6 is a view, in perspective, of a finished sponge.

Referring more particularly to the drawings, I have shown a form of trimming machine which is adapted to automatically trim off the outer skin or coating which is formed on rubber sponges, and the like, during their process of manufacture. This device is also intended to give the desired shape to the sponge.

In the device, I provide a casing 10 for housing a trimming knife 11. The trimming knife 11 is preferably a rotary knife having a number of blades, although it may be any form of cutting device desired. In the form shown, I have broken away a portion of the casing in Fig. 1 to show one of the blades of the cutting knife and show its relation to a slot 12 formed in one side of the casing. The slot 12 is preferably narrow and having one of its edges adapted to coöperate with the knife or cutting member 11 to shear particles of the sponges, or other articles to be trimmed, which are held against the casing 10 in such a manner that the portion to be trimmed off is pressed through the slot into operative engagement with the knife.

On the base 14 of casing 10, I provide extensions 15, in which is journaled a shaft 16. On this shaft 16 is pivotally mounted a substantially U-shaped frame 17, which has its leg portions extending upwardly in front of the casing 10 in such a manner as to provide a space between the leg portions 18 for a work-holding member. The shape and form of this frame may be varied to suit different requirements. Also the form of holder may be varied to suit different requirements. The form I have indicated comprises two alining shafts 19 journaled in the end portions 18 of the frame, and also adapted to slide longitudinally in such bearings. I preferably provide means for moving the shafts 19 toward and away from the pivotal shaft 16 of the frame. This may be done in any desirable manner; the form I have shown comprises providing bearing members 20 which are slidably mounted in slots 21 of the end parts 18 of the frame. In order to cause sliding movements of said bearings 20 in the slots 21, I provide crank arms on the shaft 16, and connect such crank arms by means of connecting links 22 with the bearings 20. In this manner each revolution of the shaft 16 will move the bearings 20 through a complete cycle of their reciprocatory movement in the slots 21. The crank arms on shaft 16 may be formed without any adjustments when so desired, but I prefer to vary the lengths of such crank arms for purposes which will be hereinafter set forth. As a means for varying the lengths of the crank arms, I provide wheels 23 and 24 on the shaft 16, and in each of said wheels I provide a T-slot 25, or its equivalent, in which is mounted the head 26 of a bolt 27. The bolt 27 provides for the connection of the links 22. The connecting links 22 may be held on the crank pins 27 in any desirable manner, I have shown nuts 28 for producing this function. The shafts 19 are driven from shaft 16 in the form of device shown, but may be driven in any desirable manner. In the construction I have shown, I provide a train of gears 29 connecting the shafts 16 and 19. Since the shafts 19 are adapted to move toward and away from the shaft 16, a flexible connection is necessary to effect driving thereof. As an example of such a driving connection, I provide two sets of links 30, which connect each of the bearings 20 with the shaft 16, with one of the gears in the train 29 journaled on the pivotal joints of the connecting links 30. With this arrangement the train of gears 29 will always be held in mesh regardless of the distance the shafts 19 are moved toward and away from shaft 16 within the limits of the movements provided for in the device.

The adjacent ends of shafts 19 are provided with plates 31, which are perforated and fixed on said shafts to turn therewith. Immediately back of each plate 31, is a plate 32, which is fixed on a hub 33, and the latter slidably mounted on one of the shafts 19. Each of the plates 32 carries a number of pointed projections 34 which pass through perforations of plates 31, and are adapted to engage the sponge 35, or other work which it is desired to trim. Each of the hubs 33 is provided with a groove 36, which is engaged by an arm 37, carried on a bar 38. The bars 38 are held under plates 39 by means of screws 40 which are threaded into the upper ends 18 of frame 17. The screws 40 are preferably tightened sufficiently to produce enough friction between the bars 38 and plates 39 to cause the plates 32 to remain in whatever position they are manually placed. Hence, when the handle ends 41 of the bars 38 are pulled so that the plates 32 withdraw the points 34 from the articles to be trimmed, such plates will remain in this position until again pressed toward each other into a new article to be trimmed. This is only one way of arranging the handling of plates 32, and may be varied when so desired. I have shown collars 42, which are fixed to the shafts 19, and springs 43 inserted between the hubs 33 and 42 to cause the plates 32 to be pressed toward each other, and therefore maintain the points 34 normally through the plates 32. With such an arrangement the handles 41 are pulled away from each other to withdraw the points 34 from an article 35 which has been operated upon, and when a new article is placed in position between plates 31, the springs automatically press the points into the new article to be trimmed, upon the handles 41 being released. In some instances it is desirable to cause the article to be trimmed to be rotated several times during the process of trimming so that the amount cut away from the periphery of the article to be trimmed may be cut away in thin shavings or chips. In order to accomplish this, I provide a means which feeds the upper ends 18 of the frame gradually toward the casing 10 during the process of trimming the sponges, or the like. As an example of such a means, I have shown a gear 44 fixed to rotate with the gear of train 29 on one of the shafts 19. This gear 44 is adapted to mesh with a gear 45, on a shaft 46, which is also journaled in one of bearings 20. At the other end of shaft 46, I provide a gear 47, which meshes with a gear 48. The gear 48 is journaled on one of shafts 19. On the hub of gear 48 I provide a cam surface 49 which is engaged by a stop 50, on a cam wheel 51. The cam wheel 51 is splined on one of shafts 19, and a spring 52 presses against the cam 51 to hold the stop 50 against the cam surface 49. The periphery of cam 51 rests against a stop 53. The stop 53 is preferably a roller cone-shaped so that as the stop 50 slides over the cam surface 49, the cam 51 will be moved longitudinally of the conical face of stop 53. The frame 17 is provided with an arm 54, which carries a weight 55 in a manner to automatically hold the cam 51 against the stop 53, as will be readily understood upon reference to Fig. 4. The gears 44 and 45 preferably have a different number of teeth therein, also gears 47 and 48 have a different number of teeth, so that as gear 44 rotates, the gear 48 will move either slower or faster than shaft 19, so that there will be a relative difference of rotation between the cam 49 and the stop 50. In use the stop 50 is adapted to ride from the lowest portion to the highest portion of cam surface 49 during the time the article 35 is trimmed, and the machine is adapted to run idle while the stop 50 travels down the other side of cam surface 49 to the lowest portion of such surface again before starting the trimming of a new article.

The shape of cam 51 controls the preferred shape of the finished sponge 35, or other article which it is desired to trim, so that by varying the shape of cam 51, a different shape will be given to the finished work. The movement of shafts 19 toward and away from the pivotal point of the frame 17 is so timed that the work will be held directly opposite the slot 12 regardless of the shape of the finished article. It will be seen that upon revolving a piece of work, such as shown in Fig. 6, it will be necessary to move the work back and forth across slot 12 in order to permit the knife 11 to always work in a plane tangent to the periphery of the article to be trimmed. These up and down movements of the shafts 19 are so timed that they will accomplish this result. When varying the shape of cam 51 to get finished articles of different shapes, the bolts 27 are set according to the up and down movements required of shafts 19. From this then it will be seen that the nearer round cam 51 is formed, the nearer bolts 27 must be set to the axis of shaft 16.

While I have illustrated and described the preferred form of my invention, I do not desire to be limited to the exact details set forth, but desire to avail myself of such variations and changes as come within the scope of the appended claims.

I claim:—

1. In combination, a cutter; a frame pivotally mounted at one end and having its other end adapted to swing toward and away from the cutter; and a work holder mounted in the swinging end of the frame and adapted for movement toward and away from the pivotal mounting of said frame.

2. In combination, a device comprising two parts, one part being a cutter member and the other part being a work-holding member, said parts being associated with each other for automatic movements, one relatively toward and away from the other in complete cycles and automatic movements perpendicularly to said first-mentioned movements in complete cycles synchronously with said first-mentioned cycles of movement.

3. In combination, a rotary cutting member; a revolving work holder pivotally mounted adjacent the cutting member; means for moving the work holder laterally toward and away from the cutting member through complete cycles; means for moving the work holder parallel to a plane substantially tangent to the path of travel of said rotary cutting member through cycles synchronously with said first-mentioned cycles of movement; and means for moving the work holder gradually toward said cutting member.

4. In combination, a rotary cutting member; a frame pivotally mounted adjacent the cutting member; a shaft slidably mounted in the frame for movement toward and away from the pivotal point of such frame; a work holder on said shaft; and means for rocking the frame on its pivotal point toward and away from the cutting member.

5. In combination, a cutter; a frame pivotally mounted at one end and having its other end adapted to swing toward and away from the cutter; a work holder mounted in the swinging end of the frame and adapted for movement toward and away from the pivotal mounting of said frame; and means for swinging the frame through one cycle of its movement and moving the work holder through one cycle of its movement at the same time.

6. In combination, a cutting member; a frame pivotally mounted; a shaft journaled in the frame adjacent the knife, a work holder carried on the shaft; a roller; a cam on the shaft engaging said roller and adapted to move the shaft and holder toward and away from the cutting means upon rotation of the shaft.

7. In combination, a cutter; a stop fixed with respect to the cutter; a shaft substantially parallel with the cutter and mounted for movement toward and away from the latter, a cam on the shaft engaging said stop and adapted to move the shaft toward and away from the cutter upon rotation of the cam.

8. In combination, a cutter; a frame pivotally mounted and having slots therein; bearings mounted in said slots; a shaft journaled in the bearings; crank arms mounted on the frame; links journaled on the crank arms and said shaft adapted to slide the shaft longitudinally of the slots upon rotation of the crank arms; and an operative connection between the crank arms and said shaft.

9. In combination, a cutter; a frame pivotally mounted and having slots therein; bearings mounted in said slots; a shaft journaled in the bearings; crank arms mounted on the frame; links journaled on the crank arms and said shaft adapted to slide the shaft longitudinally of the slots upon rotation of the crank arms; an operative connection between the crank arms and said shaft; a stop in fixed relation with respect to the cutter; and a cam on the shaft engaging said stop and adapted to move the shaft toward and away from the cutter upon rotation of the cam.

10. In combination, a cutter; a frame pivotally mounted and having slots therein; bearings slidably mounted in said slots; a shaft journaled in the bearings; means for moving the shaft and bearings longitudinally of the slots in the latter; and means for rotating the shaft connected with the first-mentioned means for moving the shaft through a complete cycle of its movements in said slots upon each complete revolution of such shaft.

11. In combination, a cutter; a frame pivotally mounted to oscillate toward and away from the cutter; bearings reciprocably mounted in the frame; a shaft journaled in the bearings; a work holder on the shaft; and means associated with the frame, shaft and bearings adapted to move each of such parts through a complete cycle of movement at the same time.

12. In combination, a cutting element; a cone-shaped roller mounted in fixed relation to the cutting element; a frame pivotally mounted and having a slot therein; a bearing slidably mounted in the slot; a shaft journaled in the frame; a crank on the shaft; a connecting rod connecting the crank with the bearing; a shaft journaled in the bearing; a work holder on the last-mentioned shaft; a cam on the last-mentioned shaft engaging the cone-shaped roller; means for moving the cam along the cone-shaped roller; and a driving connection between said shafts.

In testimony whereof I have signed my name to this specification on this 25th day of November, A. D. 1916.

FRANK V. WEDLOCK.

Witnesses:
ARTHUR L. SPRINKLE,
THOMAS COLSON.